(12) United States Patent
Brunet et al.

(10) Patent No.: US 9,563,304 B2
(45) Date of Patent: Feb. 7, 2017

(54) ACTIVE STYLUS WITH PASSIVE MUTUAL MEASUREMENTS

(75) Inventors: Samuel Brunet, Cowes (GB); Luben H. Hristov, Sofia (BG); Trond J. Pedersen, Trondheim (NO); Iqbal Sharif, Hampshire (GB)

(73) Assignee: Atmel Corporation, San Jose, CA (US)

(*) Notice: Subject to any disclaimer, the term of this patent is extended or adjusted under 35 U.S.C. 154(b) by 123 days.

(21) Appl. No.: 13/586,745

(22) Filed: Aug. 15, 2012

(65) Prior Publication Data

US 2014/0049478 A1    Feb. 20, 2014

(51) Int. Cl.
G06F 3/041    (2006.01)
G06F 3/044    (2006.01)
G06F 3/0354   (2013.01)

(52) U.S. Cl.
CPC ......... G06F 3/0416 (2013.01); G06F 3/03545 (2013.01); G06F 3/044 (2013.01)

(58) Field of Classification Search
CPC ........ G06F 3/0416; G06F 3/044; G06F 3/033; G06F 3/0354; G06F 3/03545; G06F 2203/04101; G06F 3/0317
See application file for complete search history.

(56) References Cited

U.S. PATENT DOCUMENTS

| | | | |
|---|---|---|---|
| 6,133,906 A * | 10/2000 | Geaghan | 345/179 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2006/0092142 A1* | 5/2006 | Gillespie et al. | 345/173 |
| 2009/0315854 A1 | 12/2009 | Matsuo | |
| 2010/0006350 A1* | 1/2010 | Elias | 178/18.06 |
| 2010/0155153 A1* | 6/2010 | Zachut | 178/18.03 |
| 2010/0170726 A1* | 7/2010 | Yeh et al. | 178/19.03 |
| 2010/0252335 A1* | 10/2010 | Orsley | 178/18.03 |
| 2010/0259504 A1* | 10/2010 | Doi et al. | 345/174 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Dwayne Bost
*Assistant Examiner* — Ivelisse Martinez Quiles
(74) *Attorney, Agent, or Firm* — Baker Botts, LLP

(57) ABSTRACT

An apparatus includes a sense unit operable to sense a plurality of first signals transmitted on one or more vertical lines and one or more horizontal lines of a touch sensor, the one or more vertical lines and the one or more horizontal lines operable to drive the plurality of first signals. The apparatus also includes a drive unit operable to transmit, in response to the sense unit sensing at least one of the plurality of first signals, a second signal to the one or more vertical lines and the one or more horizontal lines, the second signal changing an effective charge of the one or more vertical lines and the one or more horizontal lines.

22 Claims, 4 Drawing Sheets

(56) References Cited

U.S. PATENT DOCUMENTS

| | | | |
|---|---|---|---|
| 2010/0315384 A1* | 12/2010 | Hargreaves | G06F 3/03545 345/179 |
| 2012/0050206 A1* | 3/2012 | Welland | G06F 3/044 345/174 |
| 2012/0050207 A1* | 3/2012 | Westhues et al. | 345/174 |
| 2012/0050231 A1* | 3/2012 | Westhues et al. | 345/179 |
| 2012/0068964 A1* | 3/2012 | Wright | G06F 3/03545 345/174 |
| 2012/0105362 A1* | 5/2012 | Kremin et al. | 345/174 |
| 2012/0154340 A1* | 6/2012 | Vuppu et al. | 345/179 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0002606 A1* | 1/2013 | Mann | G06F 3/044 345/174 |
| 2013/0106720 A1* | 5/2013 | Shahparnia et al. | 345/173 |
| 2013/0106722 A1* | 5/2013 | Shahparnia | G06F 3/044 345/173 |
| 2013/0106760 A1* | 5/2013 | Pedersen | G06F 3/03545 345/174 |
| 2013/0207926 A1* | 8/2013 | Kremin et al. | 345/174 |
| 2013/0207938 A1* | 8/2013 | Ryshtun et al. | 345/179 |
| 2013/0207939 A1* | 8/2013 | Kremin | G06F 3/044 345/179 |
| 2013/0249870 A1* | 9/2013 | Slaby et al. | 345/179 |
| 2014/0028577 A1* | 1/2014 | Krah et al. | 345/173 |
| 2014/0028634 A1* | 1/2014 | Krah et al. | 345/179 |

\* cited by examiner

ACTIVE STYLUS WITH PASSIVE MUTUAL MEASUREMENTS

TECHNICAL FIELD

This disclosure relates generally to touch screen technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

In particular implementations of a touch sensor, the touch sensor may be configured to detect and/or track the location of an active stylus in proximity to the touch sensor. Example embodiments of a touch sensor and active stylus are herein described. In particular embodiments, the active stylus may interact with a touch sensor using passive mutual measurements by the touch sensor. The touch sensor may operate in two modes, one in which the touch sensor drives a signal on the touch sensor's horizontal and vertical electrodes lines and one in which the touch sensor takes passive mutual measurements of the horizontal and vertical electrodes. The active stylus may similarly operate in two modes, one in which the active stylus detects a drive signal on the active stylus tip, and one in which the active stylus activates a voltage on the active stylus tip. When the active stylus detects the drive signal, the active stylus may, in response, activate the voltage. After transmitting the drive signal, the touch sensor may begin to take passive mutual measurements of the horizontal and vertical electrodes. Based on the effect of the voltage on the passive mutual measurements, the touch sensor may determine the location of the active stylus relative to an intersection of a horizontal electrode and vertical electrode. A more detailed description of example embodiments of a touch sensor and active stylus, including technical advantages of various embodiments, are described below with respect to FIGS. 1 to 5.

Figure 1:
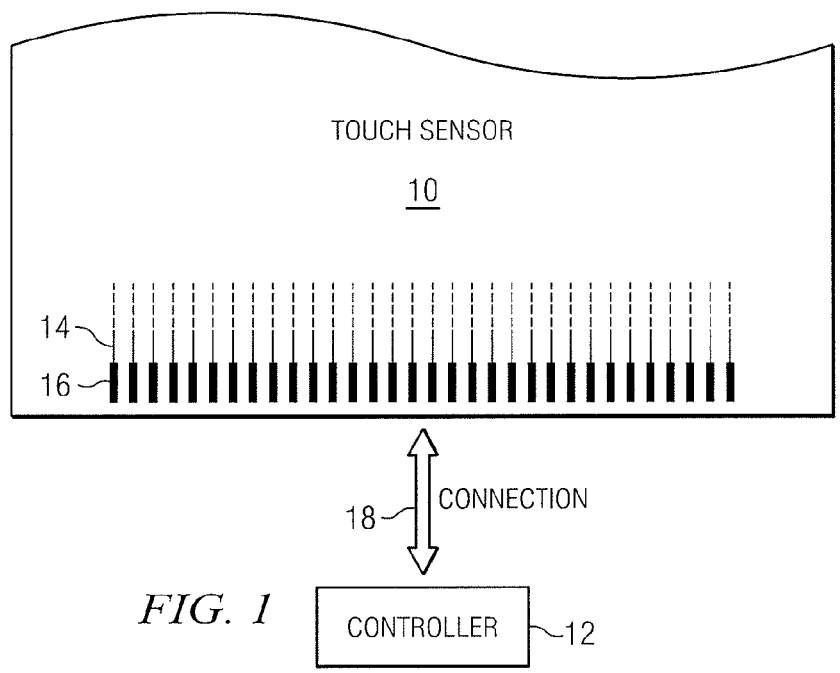
FIG. 1 illustrates an example touch sensor.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, in particular embodiments. Similarly, reference to a touch-sensor controller may encompass both the touch-sensor controller and its touch sensor, in particular embodiments. Touch sensor 10 may include one or more touch-sensitive areas, in particular embodiments. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, in particular embodiments. Alternatively, in particular embodiments, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), in particular embodiments. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, in particular embodiments. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

In particular embodiments, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, in particular embodiments, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, in particular embodiments.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, in particular embodiments. Similarly, reference to a sense line may encompass one or more sense electrodes making up the sense line, and vice versa, in particular embodiments.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, in particular embodiments. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, in particular embodiments. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Touch sensor 10 may interact with a touch object such as an active stylus in any suitable manner. A particular active stylus may be configured to cause a change in capacitance at a capacitive node of touch sensor 10. The change in capacitance induced by the active stylus may mimic a touch by, for example, a human finger. Accordingly, when the processor causes the drive unit to supply drive signals to the one or more of the drive electrodes, an active stylus may detect the pulse and respond by injecting a charge at a capacitive node in proximity to the active stylus. The touch-sensor controller 12 may measure the change in capacitance to detect and/or track the location of the active stylus.

In a particular implementation of touch sensor 10, touch-sensor controller 12 may successively control pulses on horizontal drive lines such that a given horizontal drive line may pulse at a given time. The active stylus may detect the edge of the pulse on the given horizontal drive line and may determine an amplitude of the pulse induced in a tip of the active stylus. In response, the active stylus may transmit a high voltage pulse on its stylus tip. The active stylus may modulate the amplitude of the pulse based on the amplitude of the pulse induced in the active stylus tip by the given horizontal drive line. The pulse transmitted by the active stylus tip may reduce the effective charge of capacitive nodes in proximity to the active stylus. The touch-sensor controller may detect the resulting effective charge on the vertical sense lines, and by coordinating the known location of the horizontal drive line pulse with the effective charge on the vertical sense lines, determine a location of active stylus.

Modulation of the pulse transmitted by the active stylus may be detected by the touch-sensor controller to facilitate determining the location of the active stylus. For example if the active stylus is moving in a direction parallel with the vertical sense lines, a modulated signal responsive to the amplitude of the drive line signal detected by the active stylus may allow the touch-screen controller to determine the active stylus's relative vertical distance from a given horizontal drive line. Modulating the signal output by the active stylus may increase the accuracy of the touch-sensor controller 12. In order to accomplish this, the active stylus may include a detection circuit that detects the amplitude of drive line pulses and modulates the pulse output on its stylus tip responsive to the amplitude of the detected drive line pulse.

In some implementations, however, it may be desirable to use such a amplitude detection and modulation circuit in the active stylus for other purposes, or, to remove it entirely. Described below with respect to FIGS. 2 to 5 is an active stylus that may interact with a touch sensor using passive mutual measurements by the touch sensor. In an implementation with passive mutual measurements, an active stylus may, in some embodiments, be provided that does not include circuitry to detect amplitude of a drive line signal and modulate the amplitude of pulse output in response to the amplitude of the detected drive line signal. Alternatively or in addition, the active stylus herein described may modulate its output to transmit other information to the touch-sensor controller 12, such as pressure information and/or tilt angle information.

Figure 2:
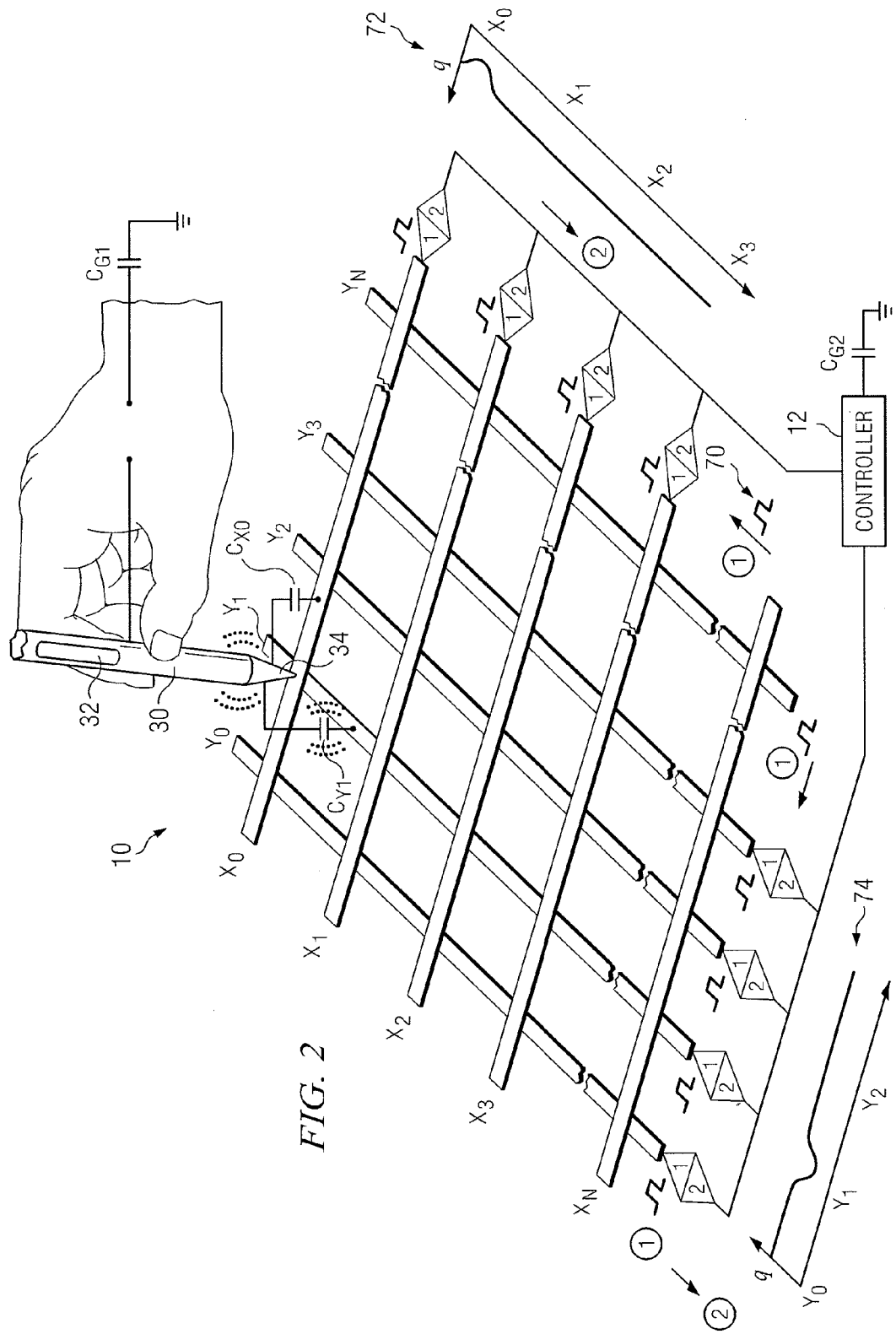
FIG. 2 illustrates an example active stylus with touch sensor device.

FIG. 2 illustrates an example active stylus 30 with touch sensor 10 and touch-sensor controller 12. Touch-sensor controller 12 may detect a location of active stylus 30 using passive mutual measurements. Touch sensor 10 includes an array of drive and sense electrodes $X_0 \ldots X_N$ and $Y_0 \ldots Y_N$. Horizontal lines $X_0 \ldots X_N$ may represent electrodes that are configured to operate as drive lines and sense lines. Vertical electrodes $Y_0 \ldots Y_N$ may represent electrodes that are configured to operate as drive lines and sense lines. It should be understood, however that while pictured as having a particular orientation and geometry, touch sensor 10 may be configured with any appropriate pattern and geometry, including the aforementioned hatched and/or mesh patterns.

Active stylus 30 includes a stylus tip 34 and an electronic circuit 32. Stylus tip 34 of active stylus 30 represents any suitable combination of components and/or circuitry to sense a pulse signal transmitted on one or more of horizontal lines $X_0 \ldots X_N$ and/or vertical lines $Y_0 \ldots Y_N$. Electronic circuit 32 represents any suitable combination of components and/or circuitry to detect the pulse signal sensed by stylus tip 34 and respond by transmitting an appropriate signal on stylus tip 34. In some embodiments, electronic circuit 32 includes a timing circuit and other components appropriate to synchronize the output of the appropriate signal on stylus tip 34 such that the signal output by stylus tip 34 occurs at a time expected by touch-sensor controller 12. A more detailed embodiment of active stylus 30 is explained below with respect to FIG. 3.

Active stylus 30 may be capacitively and/or galvanically coupled to an operator interacting with the touch screen. The operator may be capacitively ($C_{G1}$) and/or galvanically coupled to ground. Touch-sensor controller 12 may also be capacitively ($C_{G2}$) and/or galvanically coupled to ground. Accordingly, a pulse generated by stylus tip 34 and/or electronic circuit 32 may be received on the electrodes of touch sensor 10 such as one or more of horizontal lines $X_O \ldots X_N$ and one or more of vertical lines $Y_O \ldots Y_N$. Active stylus 30 also may be capacitively coupled to one or more electrodes of touch sensor 10 that are in proximity to stylus tip 34. As illustrated, active stylus 30 is in proximity to horizontal line $X_0$ and vertical line $Y_1$, which results in capacitances of $C_{X0}$ and $C_{Y1}$. Due to charge balance, a voltage pulse on stylus tip may result in a corresponding change in charge of charge on the electrodes of touch sensor 10. For example, an appropriate high voltage pulse may result in a decrease in charge on the electrodes $X_0$ and $Y_1$.

In operation, touch-sensor controller 12 may control horizontal lines $X_0 \ldots X_N$ and vertical lines $Y_0 \ldots Y_N$ according to particular modes of operation. In one mode, horizontal lines $X_0 \ldots X_N$ and vertical lines $Y_0 \ldots Y_N$ may act as drive lines. This mode may be referred to as a line active mode. In a second mode, $X_0 \ldots X_N$ and vertical lines $Y_0 \ldots Y_N$ may act as sense lines. This mode may be referred to as a line measure mode.

While in the line active mode, touch-sensor controller 12 may transmit a drive signal 70 on all or substantially all of horizontal lines $X_0 \ldots X_N$ and vertical lines $Y_0 \ldots Y_N$. In some embodiments, touch-sensor controller 12 may select a subset of $X_0 \ldots X_N$ and vertical lines $Y_0 \ldots Y_N$ on which to transmit drive signal 70. Drive signals 70 transmitted on the electrodes of touch sensor 10 may be synchronized signal spikes. The drive signals 70 may be transmitted at substantially the same time and/or have substantially the same waveform on each of the lines. Thus, each of drive signals 70 may collectively act as a single synchronized pulse signal. Moreover, in some embodiments, drive signals 70 may be used as a synchronization signal that triggers the timing sequence between touch-sensor controller 12 and the timing circuit of active stylus 30.

In response to detecting the drive signal 70, active stylus 30 transitions to an active output mode and transmits a pulse on stylus tip 34. Meanwhile, after transmitting the drive signals on horizontal lines $X_0 \ldots X_N$ and vertical lines $Y_0 \ldots Y_N$, touch-sensor controller 12 may transition the electrodes to the line measure mode. At such time, all the sense lines may be floated. If, for example, touch-sensor controller 12 does not measure on all lines, the non-measured lines should be held to ground or some constant voltage.

While in the line measure mode, touch-sensor controller acquires the effective charge on each of the X and Y lines. The charge may be acquired after a predetermined amount of time. The predetermined amount of time may be calculated to allow active stylus 30 enough time to acquire drive signal 70, ready the voltage pulse on stylus tip 34, and/or allow the effective charge to be transferred to electrodes of touch-sensor 10 that are in proximity to the active stylus tip 34, such as $X_0$ and $Y_1$ in the illustration. More detailed embodiments of example timing sequences between active stylus 30 and touch-sensor controller 12 are discussed below with respect to FIGS. 4 and 5.

As a result of the pulse on stylus tip 34 of active stylus 30, the resulting charge on electrodes proximate to stylus tip 34 may decrease. In the illustrated embodiment, active stylus 30 is located near the intersection of the $X_0$ and $Y_1$ lines. Graph 72 illustrates the resulting decrease in charge on the $X_0$ line, while graph 74 illustrates the resulting decrease in charge on the $Y_1$ line. The decrease in effective charge may be determined by touch-sensor controller 12 in order to determine the location of active stylus 30.

After a fixed amount of time after drive signal 70 is transmitted, touch-sensor controller 12 may determine to acquire the charge on horizontal lines $X_0 \ldots X_N$ and vertical lines $Y_0 \ldots Y_N$. The charges on the lines may be acquired and/or analyzed in any suitable manner. For example, touch-sensor controller 12 may include and/or be connected to one or more integrators that compute a weighted average of signals on the X lines and a weighted average of signals on the Y lines. The weighted averages may be analyzed to determine an $X_n$, $Y_m$ location of active stylus 30. After a fixed amount of time behind the negative edge of drive signal 70, while the sense lines may be floating, integrators of the acquisition circuit of controller 12 may be switched on and the transferred charge from the stylus may be transferred to the integrator capacitance. Once the integration is completed, the sense line may be connected to ground. In some embodiments the X lines may integrated by one integrator and the Y lines may be integrated by another integrator.

Another method of acquiring the charge may include measuring the charges on each of the lines by detecting a spike in voltage on the X-Y lines. Another example is using a balanced position method to locate the place between the left sum of signals and right sum of signals becomes minimum.

After the pulse is acquired during the measure line state and location of active stylus 30 determined, touch-sensor controller 12 may transition the horizontal and vertical lines back to an active line state in which the drive signal 70 is transmitted and the process may repeat.

As a result of the ability to measure on the horizontal and vertical lines of touch sensor 10, any requirement to modulate the signal in response to the amplitude of the drive signal may be reduced and/or eliminated. Accordingly, a technical advantage may include the ability to produce an active stylus without modulation hardware, resulting in lower costs and higher efficiency. This may allow an active stylus to have reduced power consumption and/or greater battery life than other active stylus solutions. Another technical advantage may be the ability to modulate the output signal of an active stylus in order to convey other information to touch-sensor controller 12, such as a detected tilt angle of an active stylus, pressure associated with an active stylus, and/or other information associated with an active stylus.

Figure 3:
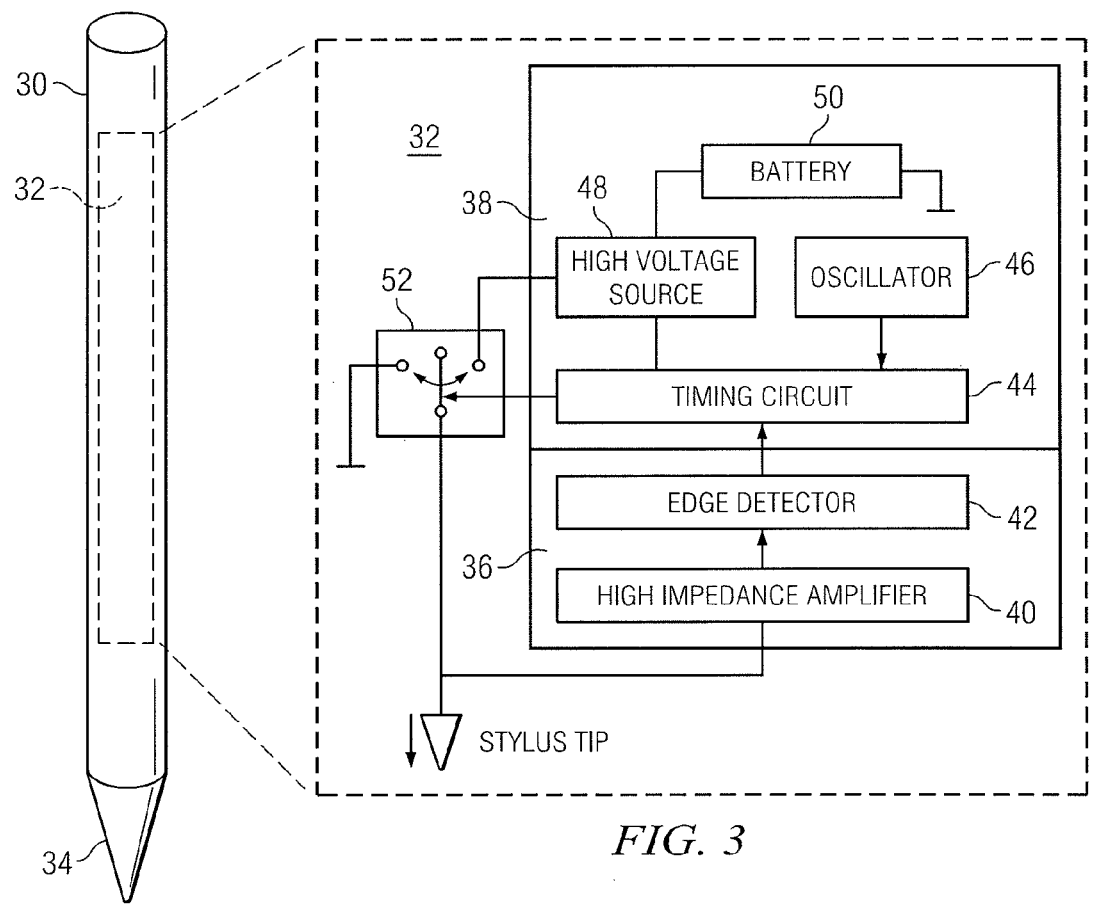
FIG. 3 illustrates an example active stylus.

FIG. 3 illustrates an example active stylus 30. As illustrated, active stylus 30 includes an electronic circuit 32 and stylus tip 34. Active stylus 30 may additionally include any number of buttons, sliders, indicators, and/or other components operable to provide human machine interaction. For example, active stylus 30 may include a angle sensor to detect tilt angle and/or a pressure sensor to detect pressure associated with the active stylus 30, such as the pressure of active stylus tip 34 against touch sensor 10 or other object. Generally, active stylus 30 detects a drive signal transmitted from touch sensor 10, and, in response, transmits an output signal on stylus tip 34.

Electronic circuit 32 includes a sense unit 36 and a drive unit 38. Sense unit 36 detects a drive signal sensed by stylus tip 34, while drive unit 38 transmits an output signal on stylus tip 34. Sense unit 36 includes high impedance amplifier 40 coupled to an edge detector 42. Sense unit 36 is used to detect drive signals transmitted on the horizontal and/or vertical electrodes of touch sensor 10.

Drive unit 38 includes a timing circuit 44, an oscillator 46, a high voltage source 48, and a battery 50. Timing circuit 44 is coupled to edge detector 42, oscillator 46, and high voltage source 48. Timing circuit 44 is connected to a switch contact of switching device 52. Timing circuit 44 controls the timing various events within active stylus 30, including its modes of operations and/or timing sequence. In some embodiments, timing circuit 44 may include a modulation circuit operable to modulate the output of high voltage source 48. Oscillator 46 may provide a clock input for timing circuit 44. Timing circuit 44 may be operable to modulate the output of high voltage source 48 in order to transmit modulated signals to touch-sensor controller 12 representative of information received from a tilt, pressure, and/or other sensor associated with active stylus 30.

High voltage source 48 represents a circuit operable to convert a low-voltage battery source to a high-voltage pulse output on active stylus tip 34. For example, in some embodiments, high voltage source 48 may output a voltage of up to 20V. Although a particular voltage is disclosed, it should be understood that any voltage operable to decrease the effective charge of horizontal and vertical lines in proximity to active stylus tip 34 may be used. Switching device 52 may be operable to selectively output the high voltage source on stylus tip 34 in response to signals received from timing circuit 44.

In operation, active stylus 30 may operate according to various modes of operation, including a measure mode and an active output mode. While active stylus 30 is in the measure mode, high impedance amplifier 40 may detect one or more signals transmitted, for example, by the horizontal and vertical lines of a touch sensor 10. The signals, may, for example be synchronized signal spikes transmitted on horizontal lines $X_0 \ldots X_N$ and vertical lines $Y_0 \ldots Y_N$. The synchronized signal spikes may, as explained above, collectively form a single signal, such as a synchronization pulse, that may be configured to synchronize the timing of the communications between touch-sensor controller 12 and active stylus 30.

Edge detector 42 may detect an edge of signal or signals transmitted by touch-sensor controller 12. Edge detector 42 may, in some embodiments detect a positive edge and/or negative edge of a synchronization pulse. In response to one or more edges being detected, edge detector 42 may transmit a signal to timing circuit 44. Timing circuit 44, in response to an edge being detected, may transition the state of active stylus 30 to the active output state in which a high voltage may be output on stylus tip 34. Timing circuit 44 may determine when to activate high voltage source 48 according to a predetermined timing sequence.

In operation, when active stylus 30 is in a measure mode, high impedance amplifier 40 may detect the drive signal 70, such as a synchronization pulse, transmitted by touch-sensor controller 12 on horizontal lines $X_0 \ldots X_N$ and vertical lines $Y_0 \ldots Y_N$. Edge detector 42 may detect the positive arising and/or falling edge of the drive signal 70 and in response, may transmit a signal to timing circuit according to the rising and/or falling edge. In response, timing circuit 44 may ready active stylus 30 for the active output mode in which high voltage source 48 is transmitted to active stylus tip 34 by turning on and/or activating switching device 52. During the time in which the high voltage is output on active stylus tip 34, timing circuit may modulate the output in order to transmit information associated with one or more sensors of active stylus 30. By modulating the height of the active output voltage, data may be exchanged between active stylus 30 and touch-sensor controller 12. For example, active stylus 30 may transmit data representative of a tilt angle of active stylus 30, of a pressure associated with active stylus 30, of one or more buttons and/or sliders being activated, and/or other appropriate information. After a predetermined amount of time, timing circuit 44 may turn off and/or deactivate switch 52. Timing circuit 44 may then ready active stylus 30 for the measure state after which the operation may repeat.

Figure 4:
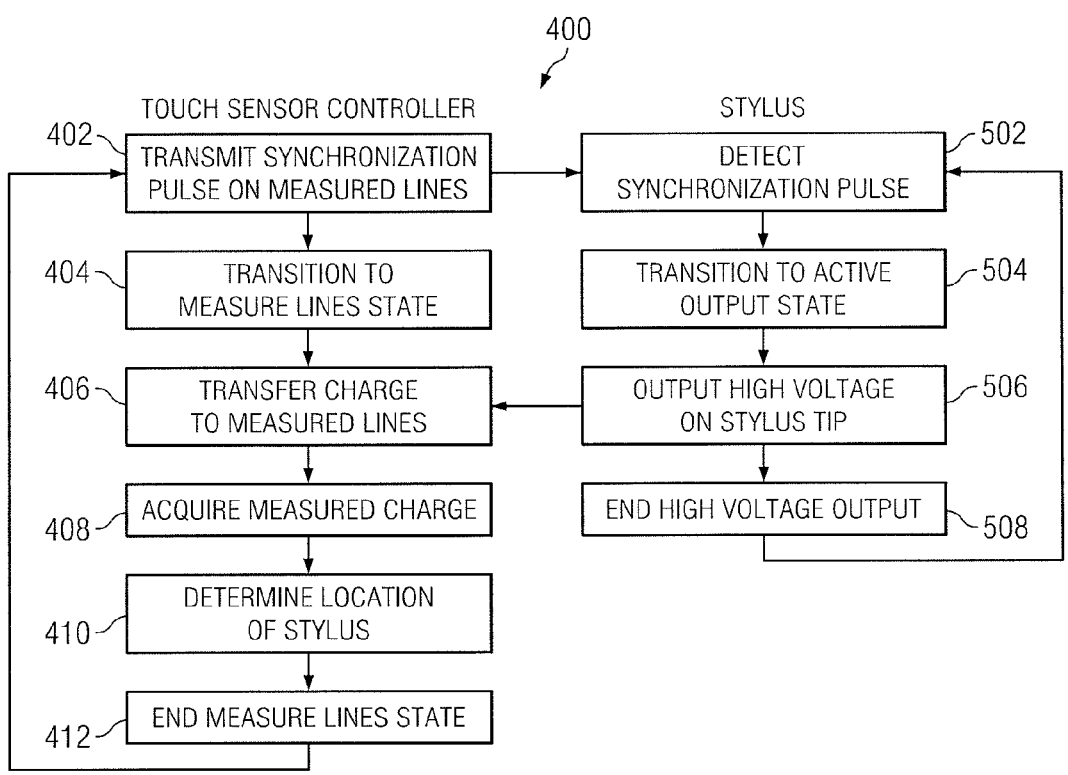
FIG. 4 illustrates an example method of communication between an active stylus and a touch sensor device.

FIG. 4 illustrates an example method 400 of communication between an active stylus 30 and a touch sensor 10. The method may start at step 402, where a drive signal 70, such as a synchronization pulse, is transmitted by the touch-sensor controller 12 on the horizontal lines $X_0 \ldots X_N$ and vertical lines $Y_0 \ldots Y_N$. During this step, the horizontal lines $X_0 \ldots X_N$ and vertical lines $Y_0 \ldots Y_N$ may be in a line active state. After transmitting the drive signal 70, such as a synchronization pulse, the method proceeds to step 404, where touch-sensor controller 12 transitions the horizontal lines $X_0 \ldots X_N$ and vertical lines $Y_0 \ldots Y_N$ to a measure lines state.

Meanwhile, active stylus 30 may be in a measure state. At step 502, active stylus detects the drive signal 70 transmitted by touch-sensor controller 12 at step 402 by sensing the drive signal 70 on stylus tip 34. In response to sensing the drive signal 70, active stylus 30 proceeds to step 504 and transitions to the active output state. While in the active output state 504, the active stylus will then at step 506 output a high voltage on stylus tip 34.

At step 406, the high voltage output on stylus tip 34 results in a charge being transferred to electrodes of touch-sensor controller 12 in proximity to active stylus tip 34 while they are in a measure lines state. After a time sufficient to transfer the effective charge as a result of the high output voltage on the stylus tip 34, touch-sensor controller 12 may, at step 408, acquire measured charge of horizontal lines $X_0 \ldots X_N$ and vertical lines $Y_0 \ldots Y_N$ lines. At step 410 touch-sensor controller 12 may determine and/or track a location of active stylus 30. For example, touch-sensor controller 12 may determine the location according to any of the techniques discussed above. At step 412, touch-sensor controller 12 may end the measured line state. Meanwhile, active stylus 30 may end the high voltage output and end the active output state.

After step 412 and step 508 complete, the touch-sensor controller 12 may transition back to an active line state at step 402 in which the drive signal 70 may be transmitted, while active stylus 30 transitions back to a measure state at step 502. Thus, the method of FIG. 4 may repeat, in particular embodiments.

Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
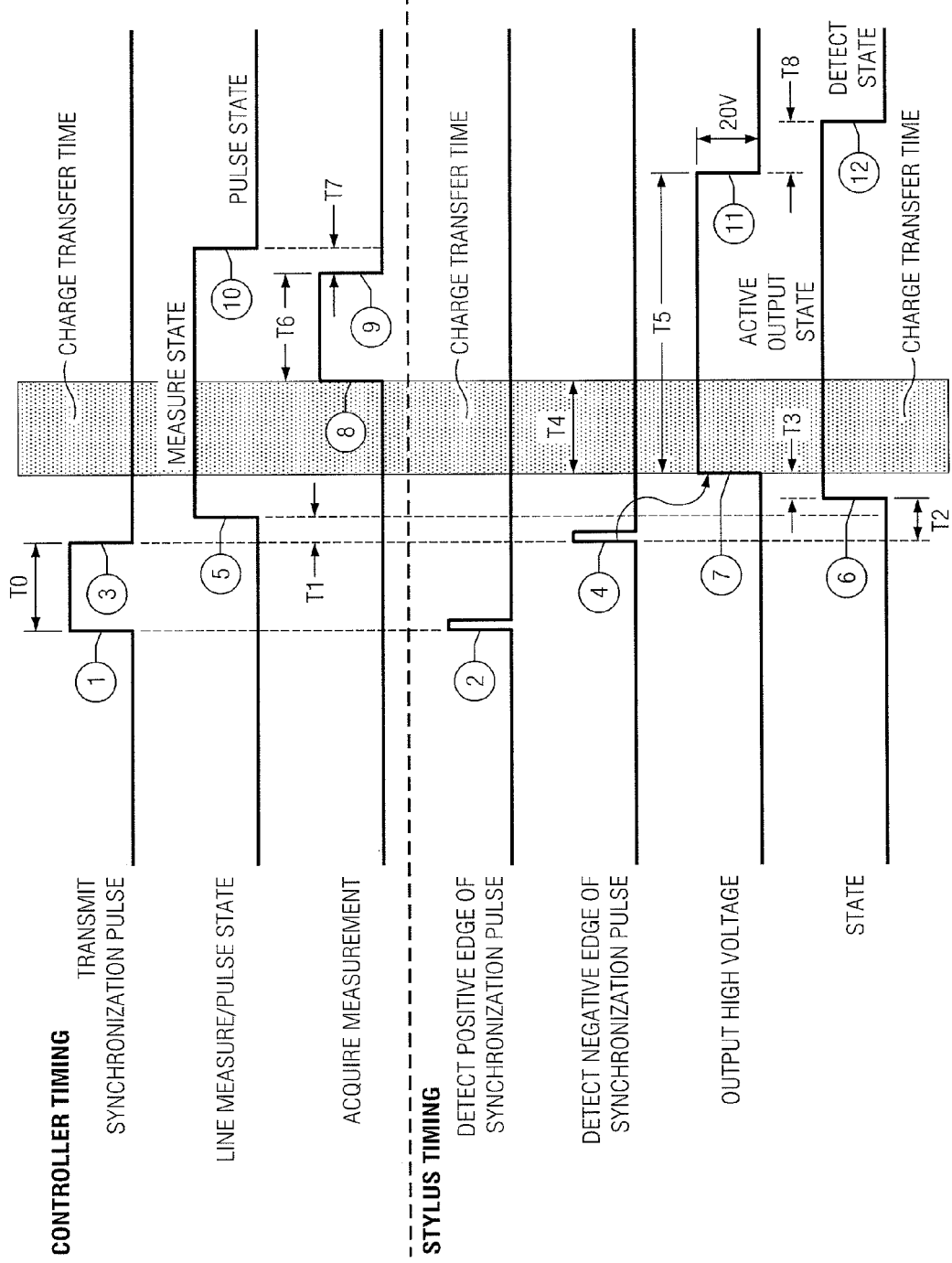
FIG. 5 illustrates an example timing diagram for communicating between an active stylus and a touch sensor device.

FIG. 5 illustrates an example timing diagram for communicating between active stylus 30 and touch sensor 10. FIG. 5 illustrates an example of a manner by which controller 12 may be synchronized with the corresponding active stylus 30 timing.

At time 1, a synchronization pulse of width T0 is transmitted on the drive lines of the touch sensor 10, which may be horizontal lines $X_0 \ldots X_N$ and vertical lines $Y_0 \ldots Y_N$ lines.

At time 2, the rising edge of the synchronization pulse stylus is detected by active stylus 30.

At time 3, the synchronization pulse ends.

At time 4, active stylus 30 detects the falling edge of the synchronization pulse.

At time 5, after the synchronization pulse is transmitted, touch-sensor controller 12 transitions the active output state to a measure state.

At time 6, active stylus 30 transitions to an active output state.

At time 7, while in the active output state, active stylus 30 begins transmitting an active high output voltage on the active stylus tip 34. The active high voltage may be of length T5. This voltage causes a charge transfer to occur on the electrodes of the touch sensor 10, indicated by the shaded vertical bar in the timing diagram. Touch-sensor controller 12 waits an appropriate amount of time (T4) for the charge transfer to occur before acquiring the charge on horizontal lines $X_0 \ldots X_N$ and vertical lines $Y_0 \ldots Y_N$ lines.

At time 8, touch-sensor controller 12 acquires the signals on the horizontal lines $X_0 \ldots X_N$ and vertical lines $Y_0 \ldots Y_N$ lines. The acquisition may require a time T6 to complete.

At time 9, the acquisition is completed and the touch-screen controller may determine a location of active stylus 30 based on the acquired signals.

At time 10, touch-sensor controller 12 will transition back to a line active, or pulse state.

At time 11, active stylus 30 ceases to output high voltage on stylus tip 34.

At time 12, active stylus 30 transitions to a measure state.

After the timing sequence completes, the sequence repeats starting at time 1.

Moreover, although this disclosure describes and illustrates particular timing functions of FIG. 5 and illustrates the communications between active stylus and touch screen device as occurring in a particular order, this disclosure contemplates any suitable steps of the method of FIG. 5 occurring in any suitable order according to any suitable timing scenario. Furthermore, although this disclosure describes and illustrates particular components, devices, or systems carrying out the timing functions of FIG. 5, this disclosure contemplates any suitable combination of any suitable components, devices, or systems carrying out any suitable steps of the method of FIG. 5.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, in some embodiments, substantially all horizontal lines $X_0 \ldots X_N$ and vertical lines $Y_0 \ldots Y_N$ lines may be pulsed with drive signal 70. In other embodiments, it may be desirable to acquire to transmit drive signal 70 only on certain subsets of the horizontal and vertical lines. Moreover, touch-sensor controller 12 may be configured to sense the charge on substantially all horizontal and vertical lines and/or sense the charge on groups of horizontal and vertical lines.

According to the teachings of the present disclosure, active stylus 30 may detect both positive and negative edge of touch-sensor controller 12 synchronization pulses. Active stylus 30 may generate high voltage pulses on both the positive and negative edges. Such an approach may allow touch-sensor controller 12 to suppress low frequency noises and/or may be used to transfer data between active stylus 30 and touch-sensor controller 12. As another example, because active stylus 30 may receive drive signals 70 from substantially all horizontal lines $X_0 \ldots X_N$ and substantially all vertical lines $Y_0 \ldots Y_N$ lines, power consumption may be reduced as a result of a reduced need to amplify the signal received on active stylus tip 34 during the measure state. This may also result in reduced production and/or manufacturing costs. As another example, because of the pulsing of substantially all horizontal lines $X_0 \ldots X_N$ and substantially all vertical lines $Y_0 \ldots Y_N$ lines, active stylus 30 may be capable of detecting the drive signal 70 even at some distance from touch screen sensor 10. In such embodiments, active stylus 30 may be capable of communicating with touch-sensor controller 12 even while active stylus 30 is hovering above a surface of the touch screen and/or not in direct contact with the touch screen. As another example, linearity may be improved over active stylus solutions and/or a faster data exchange rate may be achieved.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a touch sensor and an apparatus;
   the apparatus comprising:
   a sense unit operable to sense a plurality of first signals transmitted on one or more vertical lines and one or more horizontal lines of a touch sensor, the one or more vertical lines and the one or more horizontal lines operable to drive the plurality of first signals; and
   a drive unit operable to transmit, in response to the sense unit sensing at least a rising edge and a falling edge of one of the plurality of first signals, a second signal comprising an active high voltage output to the one or more vertical lines and the one or more horizontal lines, the second signal changing an effective charge of the one or more vertical lines and the one or more horizontal lines, the second signal comprising a modulated waveform;
   the touch sensor comprising:
   a touch-sensor controller operable to acquire the effective charge of the one or more vertical lines and the one or more horizontal lines after waiting a predetermined amount of time for a charge transfer to occur, the charge transfer resulting from the active high voltage output the predetermined amount of time calculated based at least in part on a length of time required to transmit the active high voltage output from the drive unit of the apparatus to the one or more vertical lines and the one or more horizontal lines of the touch sensor; and
   wherein the touch-sensor controller includes one or more integrators operable to, based on the acquired effective charge, compute a first weighted average of the one or more vertical lines and a second weighted average of the one or more horizontal lines.

2. The system of claim 1, wherein the sense unit comprises: a high impedance amplifier operable to buffer and amplify the first signals; and an edge detector operable to detect an edge of at least one of the first signals.

3. The system of claim 1, wherein the apparatus further comprises:
   a stylus tip;
   a stylus measure state in which the sensor unit is operable to sense the first signals on the stylus tip; and
   a stylus active state in which the drive unit is operable to drive the second signal on the stylus tip.

4. The system of claim 1, wherein the sense unit is further operable to sense a plurality of first signals transmitted on the one or more vertical lines and the one or more horizontal lines at a substantially same time.

5. The system of claim 1, wherein the sense unit is further operable to sense a plurality of first signals transmitted on one or more vertical lines and one or more horizontal lines of a touch sensor and the touch sensor is operable to sense the effective charge on the one or more vertical lines and the one or more horizontal lines.

6. The system of claim 1, wherein:
   the first signals comprise synchronized signal spikes, and the sense unit is further operable to sense the first signals by detecting at least one of the synchronized signal spikes.

7. The system of claim 1, wherein the apparatus further comprises a stylus tip;
   wherein the drive unit is further operable to transmit the second signal by activating a voltage on the stylus tip; and
   wherein the drive unit comprises a timing circuit operable to, in response to the sense unit sensing at least one of the first signals, activate the voltage.

8. The system of claim 7, wherein the voltage is a high voltage operable to decrease the effective charge.

9. The system of claim 1, wherein the touch sensor is operable to determine a location of the apparatus based on the effective charge of the horizontal lines and the vertical lines.

10. The system of claim 1, wherein the drive unit is further operable to modulate the second signal in response to one or more of a detected pressure associated with the apparatus and a detected tilt angle of the apparatus.

11. An apparatus comprising a controller, wherein the controller is configured to:
  while in a line active mode, transmit a plurality of first signals to an active stylus on a plurality of horizontal lines and a plurality of vertical lines;
  transition from the line active mode to a line measure mode;
  while in the line measure mode, sense an effective charge on the plurality of horizontal lines and the plurality of vertical lines, the effective charge responsive to a second signal from the active stylus, wherein the second signal comprises an active high voltage output that is transmitted by the active stylus in response to detecting a rising edge and a falling edge of the first signal, the second signal further comprising a modulated waveform;
  while in the line measure mode, acquire the effective charge on one or more of the horizontal lines and one or more of the vertical lines after waiting a predetermined amount of time for a charge transfer to occur, the charge transfer resulting from the active high voltage output, the predetermined amount of time calculated based at least in part on a length of time required to transmit the active high voltage output from a drive unit of the active stylus to the one or more vertical lines and the one or more horizontal lines of the apparatus; and
  based on the acquired effective charge, compute, by one or more integrators, a first weighted average of the one or more vertical lines and a second weighted average of the one or more horizontal lines.

12. The apparatus of claim 11, further operable to transmit the plurality of first signals on the plurality of vertical lines and the plurality of horizontal lines at a substantially same time.

13. The apparatus of claim 11, wherein:
  the first signals comprise synchronized signal spikes; and
  the active stylus is operable to sense the first signals by detecting at least one of the synchronized signal spikes.

14. The apparatus of claim 11:
  further operable to receive a high voltage signal from the active stylus; and
  wherein the high voltage signal decreases the effective charge of at least one of the horizontal lines and at least one of the vertical lines.

15. The apparatus of claim 11, further operable to determine a location of the active stylus based on the effective charge of the plurality of horizontal lines and the plurality of vertical lines.

16. The apparatus of claim 11, further operable to:
  detect a modulated effective charge on one or more of the horizontal lines and one or more of the vertical lines; and
  determine one or more of a tilt angle of the active stylus and a pressure associated with the active stylus.

17. A method, comprising:
  transmitting a synchronized first signal on each of a plurality of horizontal lines and each of a plurality of vertical lines of a touch screen device, wherein the synchronized first signal is sensed on a stylus tip of an active stylus;
  sensing an effective charge of the plurality of horizontal lines and the plurality of the vertical lines, wherein the active stylus activates an active high voltage output on the stylus tip in response to detecting a rising edge and a falling edge of the synchronized first signal, the active high voltage operable to change the effective charge on one or more of the horizontal lines and one or more of the vertical lines, the active high voltage comprising a modulated waveform;
  acquiring the effective charge of the plurality of horizontal lines and the plurality of the vertical lines after waiting a predetermined amount of time for a charge transfer to occur, the charge transfer resulting from the active high voltage output, the predetermined amount of time calculated based at least in part on a length of time required to transmit the active high voltage output from a drive unit of the active stylus to one or more vertical lines and one or more horizontal lines of the touch screen device; and
  based on the acquired effective charge, determining a location of the active stylus using one or more integrators, wherein the one or more integrators compute a first weighted average of the plurality of vertical lines and a second weighted average of the plurality of horizontal lines.

18. The method of claim 17, further comprising:
  transmitting the synchronized first signal while a touch-sensor controller is in a line active mode; and
  transitioning the touch-sensor controller to a line measure mode.

19. The method of claim 17, wherein the synchronized first signal comprises a synchronized signal spike and the active stylus is operable to sense the synchronized first signal by detecting the synchronized signal spike.

20. The method of claim 17, further comprising detecting one or more of a tilt angle of the active stylus and a pressure associated with the active stylus.

21. A method, comprising:
  sensing a synchronized first signal on a stylus tip of an active stylus, wherein the synchronized first signal is transmitted on each of a plurality of horizontal lines and each of a plurality of vertical lines of a touch screen device; and
  activating an active high voltage on the stylus tip in response to detecting a rising edge and a falling edge of the synchronized first signal, the active high voltage operable to change an effective charge on one or more of the horizontal lines and one or more of the vertical lines, the active high voltage comprising a modulated waveform; wherein the touch screen device:
  senses the effective charge of the plurality of horizontal lines and the plurality of vertical lines,
  acquires the effective charge of the plurality of horizontal lines and the plurality of vertical lines after waiting a predetermined amount of time for a charge transfer to occur, the charge transfer resulting from the active high voltage output, the predetermined amount of time calculated based at least in part on a length of time required to transmit the active high voltage output from a drive unit of the active stylus to one or more vertical lines and one or more horizontal lines of the touch screen device, and
  based on the acquired effective charge, determines a location of the active stylus using one or more integrators, wherein the one or more integrators compute a first weighted average of the plurality of vertical lines and a second weighted average of the plurality of horizontal lines.

22. A computer-readable non-transitory storage medium embodying logic configured when executed to:
  transmit a synchronized first signal on each of a plurality of horizontal lines and each of a plurality of vertical lines of a touch screen device, wherein the synchronized first signal is sensed on a stylus tip of an active stylus;

sense an effective charge of the plurality of horizontal lines and the plurality of the vertical lines, wherein the active stylus activates an active high voltage output on the stylus tip in response to detecting a rising edge and a falling edge of the synchronized first signal, the active high voltage operable to change the effective charge on one or more of the horizontal lines and one or more of the vertical lines, the active high voltage comprising a modulated waveform;

acquire the effective charge of the plurality of horizontal lines and the plurality of the vertical lines after waiting a predetermined amount of time for a charge transfer to occur, the charge transfer resulting from the active high voltage output, the predetermined amount of time calculated based at least in part on a length of time required to transmit the active high voltage output from a drive unit of the active stylus to the one or more vertical lines and the one or more horizontal lines of the touch screen device: and based on the acquired effective charge, determine a location of the active stylus using one or more integrators, wherein the one or more integrators compute a first weighted average of the plurality of vertical lines and a second weighted average of the plurality of horizontal lines.

* * * * *